Dec. 17, 1957        J. W. CRAMER        2,816,363
MICROMETER WITH ROTARY BASE AND PLURAL ANVILS
Filed June 2, 1955
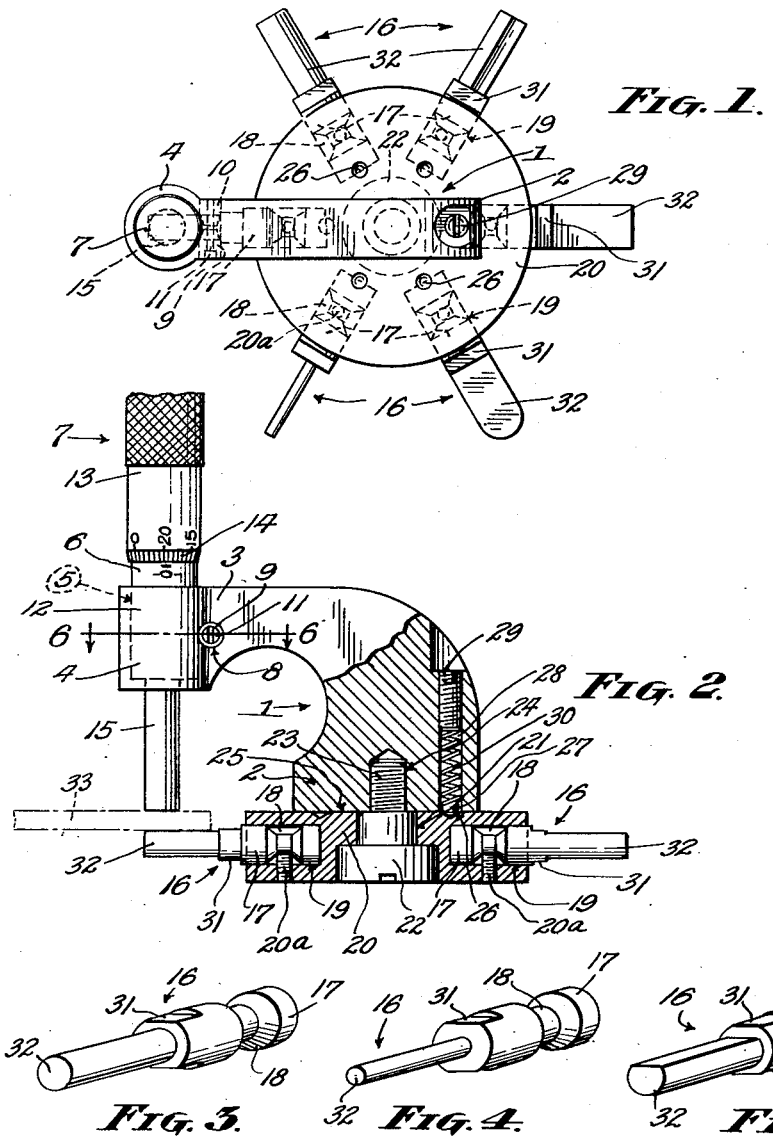
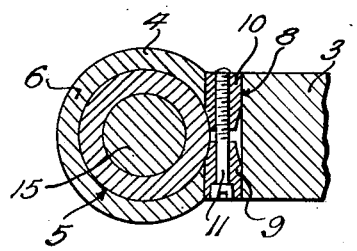
INVENTOR
*J. W. Cramer*
BY *W. J. Rambo*
ATTORNEY

United States Patent Office 2,816,363
Patented Dec. 17, 1957

2,816,363

MICROMETER WITH ROTARY BASE AND PLURAL ANVILS

James W. Cramer, West Mansfield, Ohio

Application June 2, 1955, Serial No. 512,760

4 Claims. (Cl. 33—164)

This invention relates to micrometers, a general object thereof being to provide a micrometer so constructed as to enable measurements to be made thereby more quickly and with greater convenience and facility than is possible with the use of micrometers of conventional construction.

In adapting a conventionally formed micrometer to various work-measuring conditions, it is common to provide the supporting base or frame thereof with clamping jaws. By means of these jaws, a single anvil, most suitable to the measuring conditions required, is adapted to be placed in a base socket and held therein by the clamping jaws. This is done in order that the anvil so positioned will be disposed in definite relation to an associated, longitudinally movable, screw shaft provided on the vernier barrel of the micrometer proper, said barrel being suitably clamped to the base. Thus, in meeting such different measuring conditions, considerable time and labor are consumed in the operation of substituting one anvil for the micrometer for another.

In accordance with the present invention, a micrometer is provided wherein the base thereof carries a rotatable disk-like head in which is mounted a plurality of radially outwardly projecting anvils. The latter project radially beyond the outer circumference of the head, so that upon rotation of the head the anvil best suited to the work at hand may be brought selectively into registry or alignment with the outer region of the movable screw shaft of the micrometer barrel, whereby to enable the selected anvil to be operatively substituted for another by merely rotating the anvil head in a quick and conveniently accomplished manner.

Additional objects of the invention are: to provide a micrometer in which a plurality of different types of stop or anvil elements are conveniently grouped in a rotatable holder, whereby through simple rotation of the holder, the elements held thereby may be individually presented for measuring association with a calibrated, longitudinally adjustable, micrometer screw shaft; to provide a micrometer of this character in which the holder is of disk-like form and provides a convenient, flat-surfaced, base-engaging means for placing the micrometer in a stable upright position when resting on a horizontal support; to provide a micrometer with a gang-mounted anvil holder rotatably disposed on an associated micrometer base or frame member, and wherein spring-pressed ball and socket means are provided between the holder and the base or frame member in retaining positively any given adjustment on the part of the holder and anvil devices carried thereby in operative relation to other measuring instrumentalities of the micrometer; and to provide micrometer apparatus of this character which comprises an improvement generally over micrometers of the prior art, particularly with regard to its structural simplicity, manufacturing economy and mode of operation.

With these and other objects in view, the present invention consists in the novel features of construction, combinations of elements, and arrangement of parts, all of which are hereinafter more fully described and pointed out in the annexed claims.

In the accompanying drawing, forming a part of this specification and in which similar characters of reference denote like and corresponding parts throughout the several views thereof:

Fig. 1 is a top plan view of a micrometer formed in accordance with the present invention;

Fig. 2 is a view partly in vertical section and side elevation of my improved micrometer;

Figs. 3, 4 and 5 are detail perspective views disclosing different types of gauge stops or anvils which may be mounted in gang formation in the rotatable chuck head of the micrometer;

Fig. 6 is a detail horizontal sectional view on the line 6—6 of Fig. 2.

Referring to the drawings, my improved micrometer, in the specific embodiment thereof illustrated, comprises a base or frame member 1 of curved, elbow-shape formation. The member so formed thus provides a vertical arm 2 and a rigid, laterally offset, forwardly and horizontally projecting arm 3.

In this instance, the outer portion of the arm 3 is enlarged as at 4 and includes a socket 5 for the holding reception of the cylindrical barrel 6 of a micrometer assembly 7. To securely hold the micrometer assembly in the socket 5, the arm 3 is formed with a transversely extending horizontal bore 8 for the reception of a pair of plugs 9 and 10. The bore 8 partly intersects the socket 5 and the inner ends of the plugs are tapered or formed with a radius to correspond with the cylindrical curvature of the barrel 6. The plug 9 is formed with an axial opening for receiving the headed end of a clamping screw 11, the threaded shank of said screw being received in an internally threaded bore provided in the plug 10. By tightening the screw 11, the plugs are adapted to be drawn toward each other to cause their tapered inner ends to apply clamping pressure to the barrel 6.

The micrometer assembly may be of any conventional form. In this instance, the same has been shown as including the barrel 6. Around this barrel there is turnably mounted the usual outer jacket or sleeve 13 formed at its lower end with a vernier graduation 14. Turning movement imparted to the jacket or sleeve produces longitudinal raising and lowering movement, advancement or retraction, of a measuring shaft 15.

Selectively cooperative with the lower or outer end of the shaft 15 is any one of a plurality of gauge stops or anvils 16. As shown in Figs. 3, 4 and 5, each of these stops or anvils is formed to comprise a cylindrical body 17 which is annularly grooved as at 18 for reception in one of a plurality of radially disposed, circumferentially spaced sockets 19 provided in a rotatable, disk-like, anvil head 20. Set screws 20a engage at their inner ends the walls of the grooves 18 to hold the stops or anvils securely in place but in a readily removable manner.

The head 20 is provided with a stepped axial bore 21 for the reception of a correspondingly formed shank of a supporting screw 22, the threaded end 23 of said screw shank being received in a threaded opening 24 provided therefor in the flat, horizontally extending base surface 25 of the base member arm 2. The flat upper surface of the anvil head 20 in contact with the surface 25 is provided with circumferentially spaced dimples or depressions 26 which, upon rotation of the head 20, receive a position-maintaining ball element 27 disposed in the bottom of a vertical bore 28 formed in the arm 2 of the base member 1. The upper end of the bore 28 is threaded for the reception of an adjustable closure plug 29 and a coiled spring 30 is positioned in said bore and confined between the plug 29 and the ball element 27 to hold the latter in a positive manner in a depression 26 of the anvil head in registry therewith.

In the construction, each stop or anvil 16 may be brought into selective registry with the screw shaft 15 of the micrometer assembly 7 and held secure in such registry against casual dislocations. However, due to the sloping walls of the depressions 26, the ball element 27 confined therein and the spring means 28, little effort is required to rotate manually the head 20 in bringing the desired stop or anvil into position of micrometer registry.

The stops or anvils 16 are of such length that each thereof projects radially a substantial distance beyond the peripheral surface of the head 20 to which the outer ends of the sockets 19 open. The cylindrical body 17 of each stop or anvil is of uniform diameter and formation with respect to the bodies of the remaining anvils, so that complete interchangeability of the anvils is provided. In this instance, the outer part of each body is provided with opposed, parallel, tool-receiving, flat surfaces 31 which are disposed beyond the peripheral surface of the head disk so that the anvils may be individually adjusted to zero value positions in relation to the micrometer screw shaft 15. Beyond the surfaces 31, the anvils provide longitudinal measuring extensions 32 of varying sizes and shapes, which may be used in measuring and locating in work pieces, such as that shown at 33, holes, slots, flats, grooves, projections, recesses, and a great variety of other shapes or formations, including use of such anvils as thread comparators or point micrometers.

From the foregoing it will be apparent that the micrometer of the present invention readily adapts itself to quick, skillful and convenient usage. The stops or anvils are interchangeably mounted in the horizontally positioned rotatable head of the device, where any one of the same may be easily brought into precise registry with the longitudinally adjustable micrometer shaft. Due to the horizontal position of the head 20 and the radial arrangement of the stops or anvils, the inactive stops or anvils are out of the way and do not interfere with the positioning of the device on and around work surfaces.

While I have set forth in detail a single presently preferred embodiment of my improved micrometer, and have defined its construction narrowly for the purpose of developing the constructional and operational advantages thereof, nevertheless it will be understood that said construction is subject to certain mechanical variation, part substitution and modification. Therefore, I reserve the right to employ exclusively all forms of the appliance falling within the scope of the appended claims.

I claim:

1. In a micrometer; a frame member providing a pair of perpendicularly related arms; a micrometer screw shaft mounted for longitudinal movement in one of said arms; a disk-like head carried by the other of said arms for axial turning movement in a plane perpendicular to the plane of movement of said micrometer shaft; and a plurality of differently sized or shaped anvils removably secured in spaced radially extending sockets formed in said head, said anvils projecting beyond the outer periphery of said head for selective registry with said micrometer screw.

2. In a micrometer; a frame member embodying vertically and horizontally disposed arm portions; a micrometer assembly including a vernier-regulated, longitudinally movable, screw shaft; means for adjustably and removably clamping said assembly in an inverted position to the horizontal arm portion of said frame member, said screw shaft depending vertically from the clamped portion of the assembly; an anvil-carrying head mounted on the vertical arm portion of said frame member for turning movement about a substantially vertically disposed axis; and a plurality of differently sized or shaped gauging anvils removably carried in relatively circumferentially spaced order by said head, each of said anvils projecting horizontally and radially outwardly from said head in perpendicular relation to the screw shaft of said micrometer assembly and adapted to be brought selectively into alignment with the lower end of the screw shaft of said micrometer assembly upon rotation of said head.

3. Micrometer apparatus as defined in claim 2, and wherein said frame member is provided with spring-pressed indexing means engageable with said head for resiliently holding the latter against casual turning movement when the anvils carried thereby occupy positions of alignment with said screw shaft.

4. A micrometer comprising a frame formed with perpendicularly related arm portions; a micrometer assembly mounted on one of the arm portions of said frame and including a vernier-regulated, longitudinally movable shaft disposed in substantially adjacent parallel relation to the other arm portion of said frame; a substantially flat disk-like anvil-carrying head rotatably mounted for axial rotation on the other of said arm portions and formed with a plurality of circumferentially spaced, radially disposed sockets; a plurality of differently shaped anvil stops removably carried in the sockets of said head and projecting radially outwardly from the periphery of said head in perpendicular relation to the plane of movement of the shaft of said micrometer assembly, each of said anvil stops being formed adjacent the periphery of said head with a flattened position-indexing region and being adapted to be brought selectively into alignment with the shaft of said micrometer assembly upon rotation of said head; said head being formed adjacent the said other of the arms of said frame with a plurality of concave recesses disposed in radial alignment with the sockets of said head; and a spring-pressed ball carried by said frame and engageable with the recessed portions of said head for resiliently constraining the latter against rotational movement when any one of said anvils occupies a position of alignment with the shaft of said micrometer assembly.

References Cited in the file of this patent

UNITED STATES PATENTS

| | | |
|---|---|---|
| 1,318,726 | Ciha | Oct. 14, 1919 |
| 1,446,926 | Parker | Feb. 27, 1923 |
| 2,096,956 | Brown | Oct. 26, 1937 |
| 2,499,418 | Rinaldy | Mar. 7, 1950 |
| 2,541,821 | Kneissler | Feb. 13, 1951 |

FOREIGN PATENTS

| | | |
|---|---|---|
| 345,897 | Germany | Dec. 22, 1921 |
| 855,458 | France | May 11, 1940 |